Patented June 4, 1940

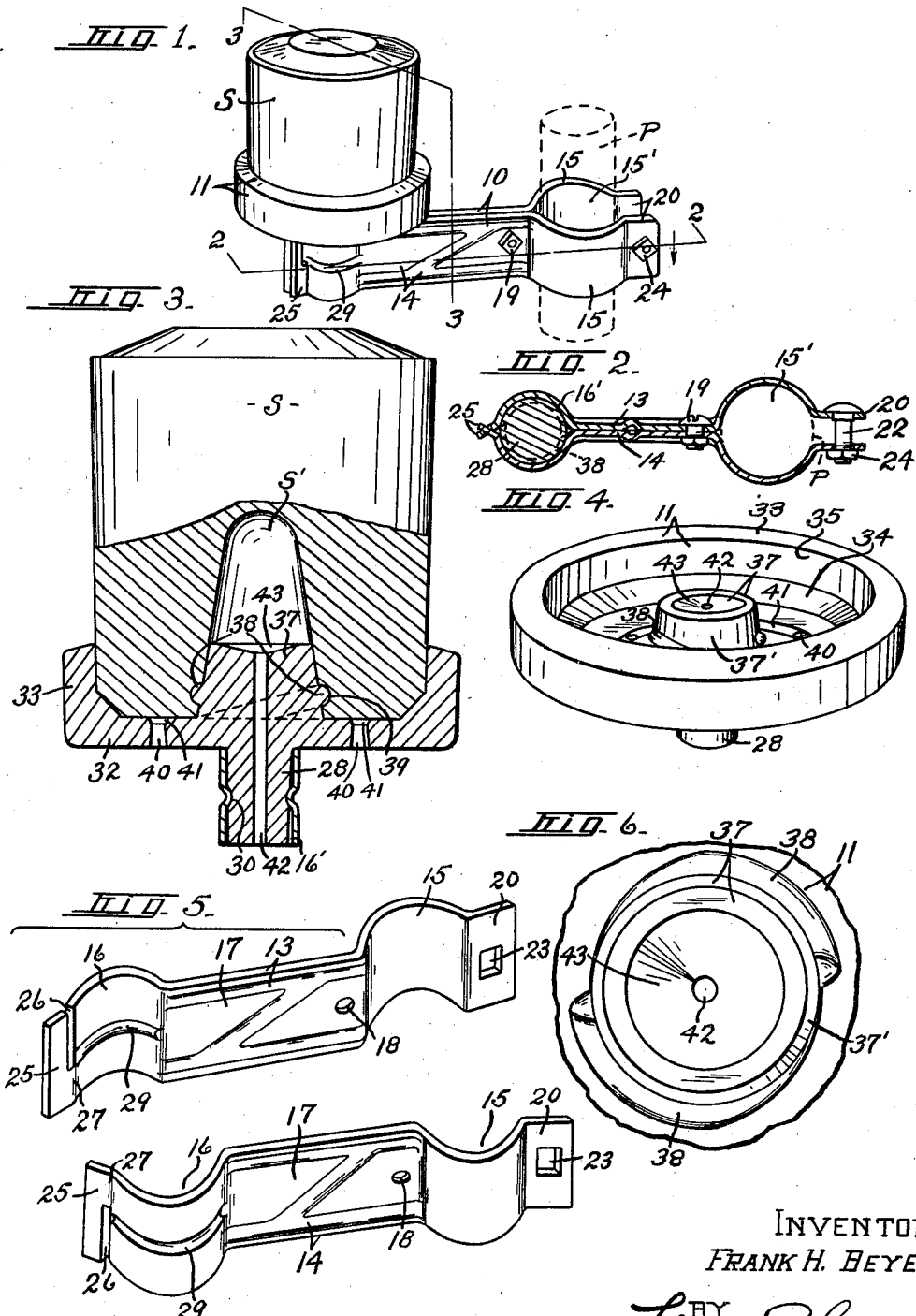

2,203,275

UNITED STATES PATENT OFFICE 2,203,275

SALT BLOCK HOLDER

Frank H. Beyea, Union Springs, N. Y.

Application February 8, 1939, Serial No. 255,292

13 Claims. (Cl. 119—51)

This invention relates to improvements in a holder for salt in block or cake form and pertains more particularly to a holder adapted to support the salt in such a position that live stock, such as cows, horses or other animals, may readily feed therefrom.

Heretofore there have been in general use two forms of holders for salt compressed into cakes or blocks. One of these holders is composed of a hollow cylindrical receptacle or container adapted to loosely receive a salt cake therein. The container is provided with an opening or recess at the bottom end thereof for exposing a portion of the lower edge of the cake of salt. The other form of holder is comprised of a wedge-like plug adapted to be received in a conical opening provided in the lower end of the salt cake substantially centrally thereof. This plug is rotatably carried in a vertical position by a bracket of suitable design to be secured to an available support such as a post or a stanchion or stall member.

The first mentioned form of salt holder must be mounted at such an elevation that the animal may lick the lower portion of the salt cake which is in registration with the container recess. Many animals, particularly cows, seem to be averse to reaching upwardly for food and do not eat of the salt when thus located in an elevated position. When using the plug type of holder, nearly the entire outer surface of the salt cake is exposed with the result that the animal usually feeds from the cake by licking the vertical side thereof and one side of the cake is usually consumed more rapidly than the opposite side. This results in a considerable amount of the salt being wasted due to one side portion of the cake becoming loosened and falling from the plug as the other side portion thereof is consumed down to the plug.

Furthermore, when using the plug type of holder care must be taken to mount the holder as close as possible to the ground or floor so that the tongue of the animal feeding from the cake of salt will not engage the bottom of the cake and thereby eventually loosen the cake and lift it off the tapered plug.

The main object of this invention is to produce a holder for salt that has been compressed into blocks or cakes which will maintain a block or cake of salt at the most desirable position with respect both to accessibility and elevation for animals to easily feed therefrom and, at the same time, so support the block or cake that there will be no appreciable waste of the salt.

In carrying out the above mentioned object, I have provided a holder comprising a bracket and a relatively shallow, hollow receptacle or basin rotatably supported by the bracket. The basin is so designed that it will engage and cover the lower end and a small portion of the side of the salt cake adjacent thereto and thereby prevent an animal from lifting the cake from the holder by pressure exerted on the lower end of the salt cake. Furthermore, the basin is so constructed that the cake will not fall from the holder even though one side portion thereof is consumed faster than the opposite side portion.

Another advantage derived from my novel salt holder resides in the fact that the salt is firmly supported by the holder until it is substantially entirely consumed.

I attain these objects by mechanism illustrated in the accompanying drawing, in which:

Figure 1 is a perspective view of a holder for cakes or blocks of salt embodying the various features of this invention. The holder is illustrated clamped to a post which is shown by broken lines and as having a salt block or cake operatively connected therewith.

Figure 2 is a horizontal sectional view through the supporting bracket taken substantially in the plane of the line 2—2, Figure 1.

Figure 3 is a transverse vertical sectional view taken substantially in the plane of the line 3—3, Figure 1, the upper portion of the salt block being illustrated in elevation.

Figure 4 is a perspective view of the basin portion of the holder illustrated detached from the bracket portion thereof.

Figure 5 is a perspective view illustrating the two sections of the bracket shown in Figure 1, said sections being arranged in spaced opposed relation to each other.

Figure 6 is a top plan of the central portion of the basin illustrated in Figure 4, showing the arrangement of the screw-threads associated therewith.

As indicated above, my novel salt holder comprises, primarily, a bracket 10 adapted to be secured to a suitable support and a basin 11 adapted to carry the block or cake of salt, and which is rotatably connected with the bracket 10.

The bracket 10 is composed of two substantially identical sections 13 and 14 stamped from sheet steel and which are preferably dipped in hot tin to prevent these members being corroded by salt coming in contact therewith. Each section is bent to provide semi-circular recesses 15 and 16 adjacent the ends thereof and which are connected by a substantially straight flat shank portion 17. The semi-circular recesses 15 are so constructed that when the sections are mounted together with the recesses in opposed relation to each other, these recesses form a socket, as 15', Figures 1 and 2, for receiving a post, as P, therethrough. The shank portions 17 of the bracket sections are each provided with holes 18 adjacent the recesses 15 adapted to receive a bolt, as 19, therethrough for securing the shank portions of the bracket sections to each other.

The outer end portions 20 of the bracket sections 13 and 14 are bent to extend outwardly from the adjacent recess portion 15 in substantially parallel relation with the corresponding shank portion 17. However, these end portions are preferably arranged, as illustrated in Figure 2, in outward spaced relation to the plane of the corresponding shank portion 17 so that when the bracket sections are secured together the end portions 20 will be spaced from each other so that the bracket may be drawn into tight clamping engagement with the post P by a bolt 22 passing through aligned holes 23 provided in the end portion 20 and a nut 24 screw-threaded on one end of the bolt. The bolts 19 and 22 and the nuts therefor are, like sections 13 and 14, preferably coated with tin or other suitable material friendly to salt to maintain them against corrosion.

The end portion 25 of each bracket section 13 and 14 adjacent the recess 16 is preferably extended outwardly from the recess at an angle of inclination to the plane of the shank portion 17 so that when the sections 13 and 14 are secured together these end portions intersect each other. The end portions 25 are provided with elongated slots 26 extending inwardly from one side thereof in close proximity to the adjacent recess 16. These slots 26 extend substantially to the longitudinal center of the end portions 25 and are of such width as to readily receive the opposite side portion, as the tongue or web 27 thus formed, of the end 25 of the companion section therein, so as to hingedly secure the corresponding end portions of the bracket sections to each other.

It will now be observed that when the bracket sections 13 and 14 have the end portions 25 thereof mounted in interlocking engagement with each other, the recesses 16 will provide a socket 16' which is adapted to receive a pendent boss or stem 28 connected with the bottom of the basin 11 for rotatably securing the basin to the bracket. Each recess 16 is preferably provided with an inwardly extending flange or rib 29 formed by stamping the wall of each recess 16 inwardly substantially midway between the end thereof, as indicated in Figure 5. These ribs 29 are arranged to be received in an annular recess 30 provided in the periphery of the stem 28 intermediate the ends thereof for securing the stem and, therefore, the basin 11 to the bracket against being accidentally removed axially from the bracket and, at the same time, permit free rotary movement of the basin with respect to the bracket.

Although I have shown and described the bracket sections 13 and 14 provided with semi-circular recesses 15 for receiving a post P therein, it will be readily understood that these end portions of the bracket sections may be stamped in other forms so as to adapt the bracket to be secured to members other than a cylindrical post such as a member having a plain, flat surface or a more or less angular surface as the occasion may require.

The basin 11 is preferably composed of a composition of asbestos and cement or of other suitable water-proof material and which will not readily corrode when subjected to the action of salt. The basin, as illustrated in the drawing, comprises a substantially flat bottom portion 32 having a marginal upwardly extending flange 33. The stem 28 is connected with the bottom portion 32 substantially centrally thereof so that the basin may readily rotate about the stem as an axis when said stem is mounted in the socket 16' provided in the bracket 10. The flange 33 extends upwardly a short distance beyond the bottom 32 and defines a recess 34 adapted to receive the lower end of the cake S of salt therein.

The block of salt is preferably tapered outwardly from the lower end upwardly and the inner peripheral surface 35 of the flange 33 is correspondingly tapered so as to snugly fit the adjacent peripheral surface of the lower end of the salt block. The bottom 32 is also provided with a centrally disposed upwardly extending plug member 37. This member 37 extends above the bottom 32 a distance substantially equal to the height of the flange 33 and is tapered upwardly and inwardly from the bottom 32 in opposed relation to the tapered inner side wall 35 of the flange 33.

The salt block or cake S is provided with a centrally disposed opening or recess S' adapted to receive the plug 37 therein and to snugly fit said plug. It will thus be seen that when the cake S is mounted in the basin 11, the lower portion of the cake will be wedged between the plug 37 and flange 33 so as to be frictionally held in the basin. The peripheral surface of the plug 37 is also provided with two male screw-thread members 38 which extend from diametrically opposite sides of the plug adjacent the bottom 32 spirally about the plug substantially one-quarter of a circle. The salt block or cake S has the peripheral surface of the opening S' provided with female thread portions 39 corresponding substantially to the male thread members 38 on the plug 37 for receiving the thread members 38 therein.

It will thus be seen that the cake S may be readily secured to the basin 11 by bringing the upper end of the plug 37 into registration with the outer end portion of the opening S' and then rotating said cake one-quarter of a revolution to bring the thread members 38 and 39 into engagement with each other. The coaction of the screw-threads 38 and 39 and the tapered side walls 35 and 37' of the flange 33 and plug 37 securely fastens the salt cake in the base 11 so that said cake will not be accidentally removed from the basin by the animal feeding from the cake accidentally bumping against the cake or by the strokes of the tongue of the animal across the surface of the cake as the animal feeds therefrom.

The bottom 32 of the basin 11 is shown provided with a plurality of, in this instance four, holes 40 arranged in substantially equal circumferentially spaced relation to each other intermediate the plug 37 and the flange 33. These holes 40 have the upper ends thereof in registration with an annular recess or groove 41 formed in the upper face of the bottom 32. The object of the recess 41 and holes 40 is to permit water or liquid forming in the bottom of the basin to escape therefrom. The plug 37 may also be provided, as shown, with a central opening 42 extending longitudinally thereof with the upper end thereof in registration with a conically shaped, relatively shallow recess 43 provided in the upper end of the plug to prevent moisture collecting on said plug by the escape thereof through the opening 42.

It will now be observed that the cake of salt S may readily be mounted in the basin 11 in such a manner that the cake cannot be accidentally removed therefrom. Furthermore, the bottom 32 and flange 33 of the basin 11 prevent the bottom portion of the salt cake from being directly contacted by the tongue of an animal feeding from the cake, so that the holder may be positioned at any desired level without danger of the animal feeding therefrom accidentally removing the cake from the holder.

It will also be observed that the upper portion of the cake will be consumed before the lower portion thereof due to the protection the flange 33 affords the lower portion of the cake. This prevents the cake from becoming loosened from the basin when only partly consumed and, at the same time, the heights of the flange 33 and plug 37 are such that after the upper portion of the cake has been consumed, the portion contained between the flange and plug may readily be consumed by the animal wiping its tongue across the upper face of the cake. In this way, waste of salt is substantially entirely eliminated not only because the cake will remain connected with the basin until consumed, but also because water or saliva from the animal's mouth collecting on the upper portion of the salt may escape therefrom through the openings 40 and 42 and thereby eliminate dissolving of the salt.

Although the construction and operation of my device are particularly simple, practical and efficient, I do not wish to be limited to the exact details shown as it is evident that various changes may be made therein without departing from the spirit of the invention as set forth in the appended claims.

I claim:

1. In a holder for salt blocks having tapered side surfaces, a support comprising a bottom portion of greater cross sectional area than one end of the salt block, a marginal flange extending upwardly from said bottom portion providing a recess for receiving said end of the block therein, the inner surface of said flange being inclined to correspond to the tapered side of the block whereby the block is frictionally engaged by said flange when mounted in said recess, and means for supporting said support.

2. In a holder for salt blocks having an aperture extending inwardly from one end thereof, a supporting member having a recess adapted to receive said apertured end of the salt block therein to confine the same, said supporting member having an upwardly extending plug adapted to be received in said block aperture, and means engageable with the supporting member for holding the same.

3. In a holder for salt blocks having an aperture extending inwardly from one end thereof, a supporting member having a recess adapted to receive said apertured end of the salt block therein, said supporting member having an upwardly extending plug adapted to be received in said block aperture, the marginal wall of the recess and of said plug being tapered in opposite directions for frictionally engaging the adjacent portion of the salt block between them, and means supporting said supporting member.

4. A holder for salt blocks as defined in claim 3 wherein the plug and aperture are provided with screw-threads coacting to releasably maintain the block and supporting member in engagement with each other.

5. In a holder for a salt block having an aperture extending inwardly from one end thereof, a support for the block having a substantially flat bottom portion, and a marginal flange extending upwardly from said bottom portion defining a recess adapted to receive the apertured end of the block therein, said support having a plug extending upwardly from said bottom adapted to be received in said aperture in the salt block whereby the portion of the block in said recess is confined between the peripheral surfaces of the plug and flange, and screw-threads provided on one of said surfaces and on the adjacent portion of the block for releasably securing the block to said supporting member.

6. A salt block holder as defined in claim 5 wherein said peripheral surfaces are inclined with respect to each other in opposite directions for frictionally receiving the adjacent portion of the block between them.

7. A holder for salt blocks as defined in claim 5 wherein said bottom member is provided with a pendent stem, and means including a bracket rotatably associated with said stem for supporting the supporting member.

8. In a holder for salt blocks, a supporting element engageable with one end portion of the block, said element having a pendent stem connected therewith, a bracket supporting said supporting member composed of two similar sections provided with semi-circular recesses adjacent one end thereof, said end portions of the bracket sections having means formed integrally therewith coacting to secure the sections to each other with said recesses arranged in opposed relation to provide a socket receiving the stem therein, the peripheral surfaces of the socket and stem being provided the one with a rib and the other with a recess receiving said rib for maintaining the stem against axial movement with respect to the socket.

9. In a holder for salt blocks, a supporting element engageable with one end portion of the block, said element having a pendent stem connected therewith, a bracket composed of similar sections formed from sheet metal stampings, said sections having portions at one end bent to provide a holding means by which the bracket may be secured to a support, said sections having their opposite end portions bent to provide opposed recesses forming a socket rotatably receiving said stem therein, the ends of the sections adjacent said recesses being provided with web and slot portions at opposite sides thereof and extended in intersecting relation to each other with the web of one section received in the slot of the other section for hingedly connecting said ends of the sections to each other and to maintain said recesses in said opposed relation.

10. In a device of the class described, a salt cake having one end thereof provided with an inwardly extending aperture, and means engageable in said aperture and with the peripheral edge of the cake adjacent said end for supporting said cake.

11. The combination with a holder for salt blocks having a supporting member provided with a recess in the upper side thereof and an upwardly extending plug in said recess, a salt block having one end thereof adapted to be closely received in said recess, and an aperture in said end of the salt block adapted to receive said plug therein.

12. The combination with a holder for salt blocks having a supporting member provided with a recess in the upper face thereof and an upwardly extending plug arranged in said recess substantially centrally thereof, said plug having the peripheral surface thereof provided with screw-threads, of a salt block having one end thereof adapted to be rotatably received in said recess, said end of the salt block being provided with an inwardly extending aperture adapted to receive said plug therein, said aperture being provided with screw-threads for engaging the screw-threads on said plug.

13. The combination with a holder for salt blocks having a supporting member provided with a recess and an upwardly extending plug arranged in said recess, the marginal sides of said recess and plug being inclined in opposing directions, of a salt block having one end thereof adapted to be received in said recess, and an aperture in said end of the salt block adapted to receive the plug therein, the side surfaces of said block and aperture being inclined to correspond to said inclination of the sides of the recess and plug.

FRANK H. BEYEA.